US009992353B2

(12) United States Patent
Cooper

(10) Patent No.: US 9,992,353 B2
(45) Date of Patent: Jun. 5, 2018

(54) REVERSE POWER FEED SYSTEM

(71) Applicant: British Telecommunications Public Limited Company, London (GB)

(72) Inventor: Ian Cooper, London (GB)

(73) Assignee: British Telecommunications Public Limited Company, London (GB)

(*) Notice: Subject to any disclaimer, the term of this patent is extended or adjusted under 35 U.S.C. 154(b) by 0 days. days.

(21) Appl. No.: 15/504,887

(22) PCT Filed: Aug. 4, 2015

(86) PCT No.: PCT/EP2015/067922
§ 371 (c)(1),
(2) Date: Feb. 17, 2017

(87) PCT Pub. No.: WO2016/026688
PCT Pub. Date: Feb. 25, 2016

(65) Prior Publication Data
US 2017/0272581 A1 Sep. 21, 2017

(30) Foreign Application Priority Data
Aug. 20, 2014 (EP) .................................... 14250098

(51) Int. Cl.
*H04M 3/00* (2006.01)
*H04M 5/00* (2006.01)
(Continued)

(52) U.S. Cl.
CPC .............. *H04M 19/08* (2013.01); *G05F 1/66* (2013.01); *H04L 12/10* (2013.01);
(Continued)

(58) Field of Classification Search
CPC .... H04M 19/08; H04L 43/0817; H04L 12/10; H04W 52/34; G05F 1/66
(Continued)

(56) References Cited

U.S. PATENT DOCUMENTS 5,216,704 A 6/1993 Williams et al.
9,614,976 B2 4/2017 Joffe et al.
(Continued)

FOREIGN PATENT DOCUMENTS

EP 2120443 A1 11/2009
GB 2319 701 A 8/1997
(Continued)

OTHER PUBLICATIONS

International Search Report for corresponding International Application No. PCT/EP2015/067922 dated Oct. 28, 2015; 4 pages.
(Continued)

*Primary Examiner* — Thjuan K Addy
(74) *Attorney, Agent, or Firm* — Amy M. Salmela; Patterson Thuente Pedersen, P.A.

(57) ABSTRACT

A the network-side distribution point in a telecommunications network includes an input measurement function which monitors the total power delivered to the power combiner from the various customer premises, and an output measurement function which monitors the total power requirements of the components of the distribution point. The data from these monitoring functions are used by a power extraction control unit to control the combiner/extraction unit to draw power from the forward power feed to makes up any shortfall in the power required to operate the components. This allows each customer premises system to deliver power to the distribution point at a rate determined only by the services it is itself using, and without any need for co-ordination between the distribution point and the customer premises systems.

28 Claims, 1 Drawing Sheet

(51) Int. Cl.
*H04M 19/08* (2006.01)
*H04L 12/10* (2006.01)
*H04L 12/40* (2006.01)
*H04L 12/26* (2006.01)
*G05F 1/66* (2006.01)
*H04W 52/34* (2009.01)

(52) U.S. Cl.
CPC .... *H04L 12/40045* (2013.01); *H04L 43/0817* (2013.01); *H04W 52/34* (2013.01)

(58) Field of Classification Search
USPC ................................ 379/323, 322, 321, 324
See application file for complete search history.

(56) References Cited

U.S. PATENT DOCUMENTS

| | | | |
|---|---|---|---|
| 9,628,283 | B2 | 4/2017 | Cooper |
| 2002/0015489 | A1 | 2/2002 | Ben-David |
| 2008/0159744 | A1 | 7/2008 | Soto et al. |
| 2010/0184405 | A1* | 7/2010 | Chen ............... H04M 1/66 455/410 |
| 2012/0144214 | A1 | 6/2012 | Lee et al. |
| 2013/0251114 | A1 | 9/2013 | Humphrey |
| 2016/0327630 | A1 | 11/2016 | Mutz et al. |
| 2016/0330334 | A1 | 11/2016 | Cooper et al. |

FOREIGN PATENT DOCUMENTS

| | | |
|---|---|---|
| GB | 2 313 979 A | 12/1997 |
| GB | 2319701 A | 5/1998 |
| WO | WO 2005/043880 A1 | 5/2005 |
| WO | WO 2008/132428 A1 | 11/2008 |
| WO | WO 2009/138710 A1 | 11/2009 |
| WO | WO 2009/138711 A1 | 11/2009 |
| WO | WO 2010/082014 A1 | 7/2010 |
| WO | WO 2010/082016 A1 | 7/2010 |
| WO | WO 2013/140108 A1 | 9/2013 |
| WO | WO 2013/140109 A1 | 9/2013 |
| WO | WO 2013/140110 A1 | 9/2013 |
| WO | WO 2013/144541 A1 | 10/2013 |
| WO | WO 2015/011431 A1 | 1/2015 |
| WO | WO 2015/101674 A1 | 7/2015 |

OTHER PUBLICATIONS

Written Opinion of the International Searching Authority for corresponding International Application No. PCT/EP2015/067922 dated Oct. 28, 2015; 7 pages.
Extended European Search Report for corresponding EP Application No. 14250098.2 dated Nov. 24, 2014; 8 pages.
Extended European Search Report for EP Application No. 10250254.9 dated Jul. 23, 2010; 6 pages.
"Access, terminals, transmission and multiplexing (ATTM); Reverse power feed for remote nodes," Technical Report, European Telecommunications Standards Institute (ETSI) vol. ATTM TM6, No. V2.1.2. (Mar. 1, 2011); 24 pages. XP014064492.
"Environmental Engineering (EE); reverse powering of small access network node by end-user equipment: A4 interface, Draft ETSI TR" ETSI Standards, No. V0.0.1 (Sep. 1, 2007); 10 pages. XP014039383.
Application and Filing Receipt for U.S. Appl. No. 14/907,183, filed Jan. 22, 2016, Inventor(s): Cooper.
Application and Filing Receipt for U.S. Appl. No. 15/109,366, filed Jun. 30, 2016, Inventor(s): Cooper et al.
Application and Filing Receipt for U.S. Appl. No. 13/988,941, filed May 22, 2013, Inventor(s): Humphrey.

* cited by examiner

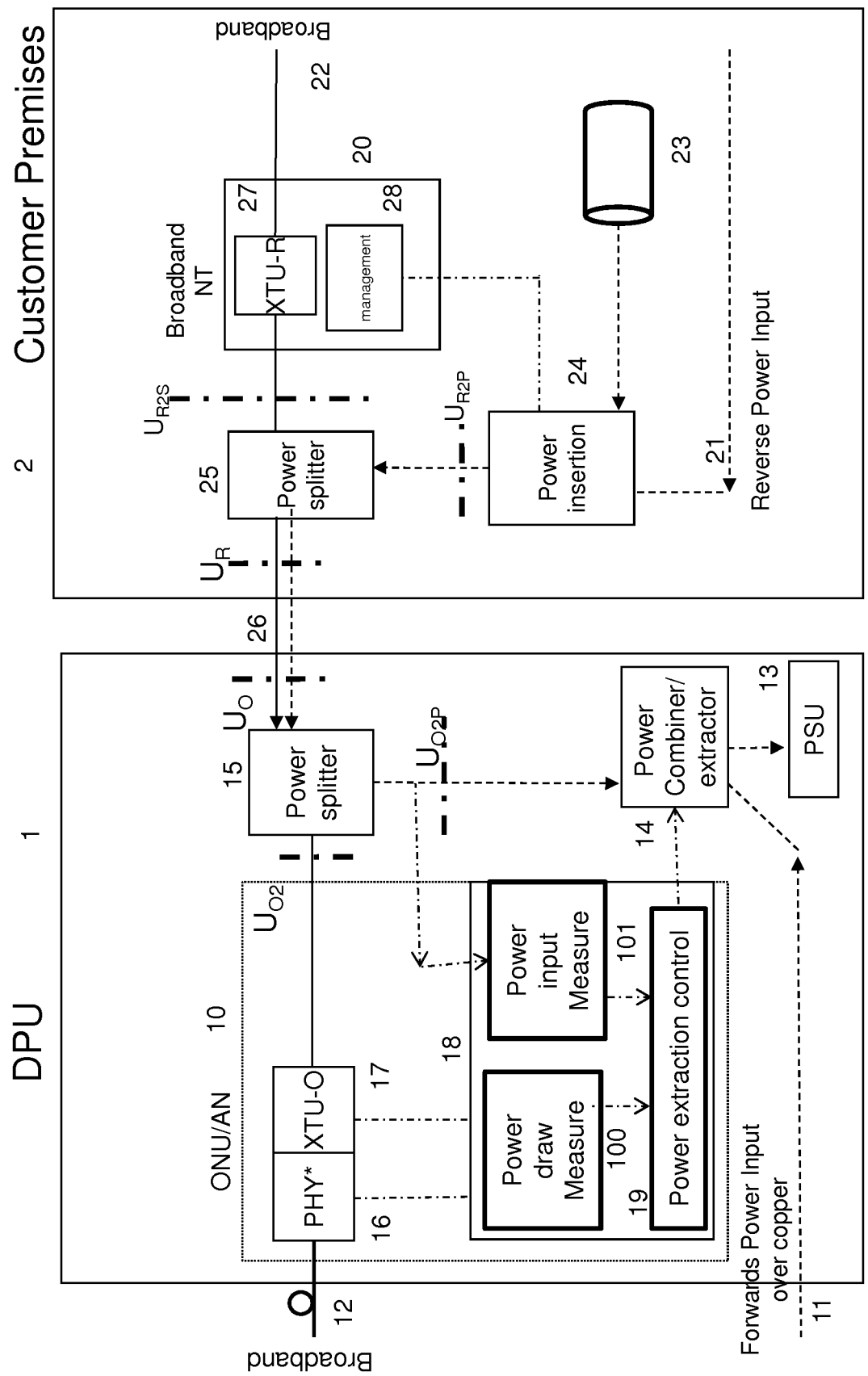

REVERSE POWER FEED SYSTEM

CROSS-REFERENCE TO RELATED APPLICATIONS

The present application is a National Phase entry of PCT Application No. PCT/EP2015/067922, filed on 4 Aug. 2015, which claims priority to EP Patent Application No. 14250098.2, filed on 20 Aug. 2014, which are hereby fully incorporated herein by reference.

TECHNICAL FIELD

This invention relates to Reverse Power Feed (RPF) provision in telecommunications systems.

BACKGROUND

In telecommunications systems, electrical components in telecommunications nodes located at Distribution Points a short distance from the customer termination are powered from the customer end instead of, as was traditionally the case, using a "forward power feed" from the exchange end. This has become more common as connections have become more complex than a simple wire pair from exchange to customer, and now require powered components such as optical/electrical interfaces at intermediate points in the network. In such cases delivering the required power from the exchange end is at worst impossible, for example if the connection is made by optical fiber, and at best inefficient, because of losses in the electrical wiring. In particular, those parts of a connection towards the exchange can be made of relatively thin wire as the individual wire pairs are bundled with others, which gives the bundle greater mechanical integrity. Closer to the customer, the copper wiring is in smaller bundles, and eventually a single wire pair, so each individual wire has to be thicker than it is towards the exchange, in order to ensure its mechanical integrity. The drop lengths are also generally shorter. These factors result in significantly less ohmic loss being incurred if the customer provides the majority of the power. It is therefore more efficient to draw power from the customer end. Such an arrangement means that the system is being powered from the customer's electricity supply, and therefore paid for by the customer. However powering from the exchange end would be less efficient, and the extra cost of doing so would eventually have to be passed on to the customer.

However, relying on collecting power from the customer end involves some uncertainties in the delivery of the power supply, which complicates the management of such remote units.

The proposed ETSI TM6 standard for Reverse Power Feed (ETSI TR 102 629) will allow interoperability between the FttDP (Fiber to the Distribution Point) remote node and the various Customer Premises equipment (CPE) to be used to provide the power to this node. Such systems also provide a battery backup in the CPE to ensure continuity of service in the event of a failure of the external supply. However, if no CPE is connected, there is no power supply to the node. One of the characteristics of the remote node units is that they are often sited at remote locations with restricted access i.e. at the top of poles or in underground chambers. This makes it difficult to maintain a reliable source of battery power at the node. Consequently, when there are no customers (users) connected to a remote unit, the unit has no power supply.

Fiber to the Distribution Point (FttDP) has an inherent problem in that when there are no customers providing power (via Reverse Power Feed RPF) then the remote Drop Point Unit (DPU) becomes un-available to the element manager that is set to remotely control that unit. In response to this issue the Persistent Management Agent (PMA) concept has been developed which provides a proxy management capability for the remote unit and is always addressable even when the remote unit is unpowered. This is important as the element manager does not 'know' if the remote unit has become un-available due to an internal or infrastructure failure or if the remote unit simply has no customers connected providing electrical power. This has the consequence of alarms being raised when a DPU becomes un-available even though there is no equipment or infrastructure failure. Mechanisms such as 'dying gasp' may be used to indicate the nature of 'how' a DPU has become un-available. However, such mechanisms are not always reliable and can put other burdens upon the network management platform.

This raises problems for the network management system being used to control and monitor this remote element since it may not be apparent whether the unit is simply unpowered or has developed a fault, or indeed if the optical fiber providing the backhaul connection to the unit has been damaged. It is therefore desirable to have an additional power supply available to the unit. Providing a power connection to the distribution point from a local utility provider is often not a practical solution since it can be expensive, and the distribution points are often in publicly-accessible curbside locations where there can be public safety concerns in providing a mains electricity supply, as well as the possibility of unauthorized connection to the electricity supply.

From another perspective, RPF has to have a fair-sharing policy when multiple users are providing power since there are two separate areas that require power when describing the power consumption of a DPU:

1) The power required for the individual line modems (xDSL modem/Layer 2 switch).
2) The common electronics in the DPU such as fiber backhaul, power management, network management, supervision electronics and Layer 2 switching functions.

When a sole user is connected to a DPU then that single user has to provide all the power. When further users connect, then each user provides the power for their individual modem and a share of power to feed the common electronic components.

High speed DSL systems such as VDSL2 and G.fast make use of crosstalk cancellation systems (also known as vectoring) which work by injecting an 'anti' crosstalk signal onto the near-end of other twisted pairs within a cable binder group such that the received signal at the far end of the cable is devoid of any crosstalk (for downstream vectoring). Obviously, as more active modems operate over a common binder group then the individual crosstalk signals that require cancellation become more complex. However, if crosstalk cancellation is being successfully operated between several users and one of the users then 'hangs-up', the power contributed by that user is lost. Until a new 'vectoring matrix' is calculated and switched over to replace the current matrix, the modem which is to leave the matrix has to continue to be powered. This means that until the system switches over to the new matrix, each modem remaining in the vector group has to operate with reduced performance in order to maintain power to all the modems, unless power can be obtained from somewhere else to keep the extra modem powered.

It is known to provide both forward and reverse power feeds to an intermediate node. In one example a backup facility takes power from the preferred (reverse) source with a failover system controlled by relays switching to a basic "lifeline" voice service, powered from the exchange end. Such a system is described in United Kingdom patent specification GB2319701 or International Patent specification WO 08/132428. However, this simple system requires a variable power draw from the customer end, depending on the services being used and the number of other users sharing the load of the common services at the node.

As noted above, forward power will generally be subject to greater resistive losses because of the longer lengths and generally thinner wiring available, and therefore to improve efficiency the remote unit should extract as much reverse power from the customer as possible (or allowed by the contract established between the customer and communications provider), to ensure that the cost of powering the remote node is mitigated as much as possible with regards to the communications provider.

If the node relies solely on power fed from the customer nodes, it has to determine how much power to draw from each one. This can be determined in part from the services being used, but may nevertheless result in unfairness, for example if one customer connection has a greater resistance than another (because it is further away, or because of damage to the line) it would need to put more power into the line to deliver the same amount at the node, to compensate for the greater ohmic losses in the line itself, despite the fact that those line properties are likely to result in a poorer service. It is known from European patent specification EP 2120443 for a distribution point to vary the power it draws from a customer line according to characteristics of the line itself, such as electrical resistance or the bitrate it can support. However, the management system in the node will not readily have information as to whether any of the individual customer nodes are subject to power supply problems, and may continue to draw power even when the customer is operating on battery power, until the battery is depleted and even the lifeline availability is lost.

SUMMARY

The present disclosure moderates some of these difficulties by providing a power management system which allows a remote unit to be selectively powered by a forward power supply or a reverse power supply according to the relative availability of such supplies at each end of the line. In particular, it should be noted that, in general, communications services requiring high power demand involve the use of a user terminal which itself draws significant electrical power whilst, in general, basic services such as simple voice telephony can be powered from the exchange end. This can be particularly important where the power at the customer end has failed, as it allows the customer to report the fault.

According to embodiments, this is achieved by providing a telecommunications local distribution network comprising a distribution point having an electrical backhaul connection; a plurality of customer premises equipments each connected to the distribution point by a respective electrical connection, at least some of the customer premises equipments having provision for delivering electrical power to the distribution point over their respective electrical connections, each customer premises equipment being capable of operating in two or more modes operating different telecommunications services and autonomously controlling the power to be delivered in accordance with its current mode of operation, the distribution point having provision for drawing electrical power from the customer premises equipments, and having provision for determining any shortfall between the power required for the operation of the distribution point and the electrical power delivered to the distribution point from the customer premises equipments, and having provision for drawing from the backhaul connection sufficient power to meet that shortfall.

In another aspect, embodiments also provide a customer premises equipment for connection to a telecommunications network by an electrical connection, having provision for delivering electrical power to the distribution point over the electrical connection, and capable of operating in two or more modes operating different telecommunications services and autonomously controlling the power to be delivered in accordance with its current mode of operation.

In a further aspect, embodiments provide a method of operating a telecommunications local distribution network comprising: a distribution point having an electrical backhaul connection; a plurality of customer premises equipments each connected to the distribution point by a respective electrical connection and capable of operation in a plurality of modes operating different telecommunications services, in which at least some of the customer premises equipments deliver electrical power to the distribution point over their respective electrical connection, by autonomously controlling the power to be delivered in accordance with its current mode of operation, and the distribution point draws from the backhaul connection any power required to meet that requirement in excess of that delivered from the customer premises equipments.

Thus the, or each, reverse feed to the node is controlled autonomously by the user terminal equipment in accordance with the power required at the distribution point to operate the services required, and the forward feed is controlled by the node to draw any additional power requirements not met by the reverse feeds. In one embodiment, each user terminal provides a reverse feed when using a high speed data service, and is shut off when operating a basic service or when an external power supply is lost. The forward feed is used to supply power for common services, and graceful shutdown of any vector or multiplex after connection to a terminal is lost. It may also provide a forward feed to any user terminals not currently able to provide a forward feed in order that a basic service may be maintained to those terminals. In one arrangement, any user terminal which loses its external power supply whilst operating a high speed data service has power maintained, either through a local battery backup or by a forward feed, for a period sufficient to allow a "graceful" shutdown.

The present disclosure therefore provides a system in which power is normally supplied from both forward and reverse sources, blended according to the services being used, the availability of power, and whether forward power from the network would be beneficial and for what purpose. The remote (distribution point) unit comprises switching and optical interface functions which use a relatively low but steady level of power, and a plurality of modems for providing interface functions with customer equipment, which require a highly variable level of power, according to which, and how many, customers are using the service. Power for the switching and optical interface functions is taken from a central source using a forward power feed. Reverse power feed is used to provide high-speed DSL services as required by the individual users. Under local power-fail conditions (at the customer end) the high-speed modem drops to a low power state and continues to provide a basic voice service using battery power only from the CPE—the remote node's basic switching/interface functions remain forward powered. The forward power feed can also be used to maintain power supply for a brief period to enable a "graceful" shut down or reallocation of power demand when one or more of the reverse power feeds are lost.

Embodiments allow delivery of Fiber to the Distribution Point with a good compromise between maximizing the amount of power delivered via reverse powering (therefore saving operating costs) whilst simplifying the network management of remote nodes. In particular, there is no need for complex persistent management agents to control the reverse power feeds, as each customer premises equipment can act autonomously, delivering a predetermined level of power depending only on the services that equipment is currently running)

Embodiments also prevent the impairment of service to remaining users in a vector group caused when the group is being reconfigured after a user has dropped out.

Because of different line conditions (length or deterioration of the wiring) ohmic losses may result in the power delivered over some of the customer connections being significantly less than others, even though the respective customer premises equipments are arranged to deliver the same power into their respective connections. Any resulting shortfall in power would be automatically compensated for by increasing the forward feed, to the node without modifying the operation of the customer equipment. The management system in the node may monitor the power it collects from each reverse feed under various operating conditions and compare it with the nominal value that should be delivered in order to identify any problems that may exist with the line or the customer premises equipment.

The customer premises equipment can be configured to deliver a reverse power feed at two or more different levels (one of which may be zero or even negative: i.e. a forward feed) depending on its current operating mode. To ensure that the customer uses equipment which operates in this way, the network operator may require the customer to use approved equipment, with an access code or other identification to allow the management system in the node to authorize provision of the services required. More simply, the distribution point may be configured not to provide high power-drain services to a line on which no, or inadequate, power is delivered over the respective connection.

BRIEF DESCRIPTION OF THE DRAWINGS

An embodiment of the invention will be described with reference to the FIGURE, which depicts a simple FttDP remote node architecture configured for both forward and reverse powering. In the FIGURE, dashed arrows indicate power feeds, chain-dashed lines indicate control connections, and solid lines indicate data (payload-bearing) connections.

DETAILED DESCRIPTION

A Distribution Point Unit (DPU) 1 comprises an interface unit (optical network unit/access network (ONU/AN) 10 which incorporates a backhaul link termination 16 and a modem—operator-side XDSL transmission unit (XTU-O) 17—by which optical signals received from a backhaul optical fiber link 11 may be converted to electrical signals for transmission over a copper "final drop" link 26 to the customer premises 2, and vice versa. The components 16, 17 of the optical network unit 10 are controlled by a management unit 18, and take power from a power supply unit 13.

In general a DPU 1 will have a number of interface units 10, each connected to a different customer premises 2 over a respective final drop connection 26, but for simplicity only one interface unit 10, drop connection 26, and customer premises 2 are depicted in this FIGURE On the customer side 2 of the final drop 26, there is connected a network termination unit 20 which incorporates a modem—remote-side XDSL transmission unit (XTU-R) 27—by which signals received from a terminal or local area network 21 may be adapted as required for transmission over the copper "final drop" link 26 to the distribution point 1, and vice versa. The network termination 27 is controlled by a management unit 28, and takes power from a power supply unit 24.

At each customer premises 2 there is a power insertion system 24 which is connected to an external power supply 22, and may be provided with a battery backup 23. In normal operation, the power insertion system 24 delivers electrical power to a power splitter 25 which allows power to be delivered to the network termination components 20, 27, and also to the network connection 26. This is known as a "reverse" power feed, as it is delivered from the customer premises "back" into the network. The data or voice traffic carried over the network connection is effectively a modulation on the power delivery. The customer premises equipment, 2 and the power insertion system 24 in particular, is controlled by a central processor 28.

The distribution point unit 1 is equipped for reverse power feed by provision of a power splitter 15 connected to the user connection 26, which extracts the data payload for transmission to the operator-side xDSL termination unit (XTU-O) 17 and delivers the power to an extraction/combiner unit 14.

The distribution point unit 1 is equipped for a forward power feed (i.e. from the network end). This feed is delivered to the extraction unit 14 over a wire connection 11 from the network.

The forward power feed can be supplied over spare copper pairs whose original use for communications has been superseded by the fiber connection 12, or over 'power-pairs' as used on hybrid fiber tube, i.e. tube used as duct to allow fiber to be blown through but which has power copper pairs embedded into the outside of the tube in order to provide a parallel wired connection, to enable a "lifeline" service (basic analog voice, and electricity to power it) as a precaution against failure of the optical components or the power supply at the DPU 1. From the extractor unit 14, power is supplied to a power supply unit 13 for distribution to the various components of the optical network unit 10 which require it.

As has been mentioned, the DPU 1 will typically handle connections 26 to several customer premises 2, each with its respective interface unit 10. The PSU 13 handles power delivery to all the optical network units 10. The power extraction unit 14 takes feeds from several drop connections 26, but typically from only one forward feed 11.

The components of the Distribution Point Unit 1 and customer premises equipment 2, and in particular the respective power distribution components 14, 24, operate under the control of respective management units 18, 28. Specifically, the customer premises management unit 28 is configured to control the power insertion unit 24 to deliver power sufficient to operate the network termination system 20, and to deliver power to the network connection 26 sufficient to support its own share of the power required to operate the optical network unit 10. According to the disclosure, this latter requirement is a predetermined value, pre-programmed into the user terminal equipment and depending only on the services currently required by the termination equipment 20. It can therefore operate autonomously, and requires no control input from the distribution point 1.

The management unit 18 in the network-side DPU 1 includes an input measurement function 101 which monitors the total power delivered to the power combiner 14 from the various customer premises 2, and an output measurement function 100 which monitors the total power requirements of the components 16, 17 of the DPU 1. The data from these monitoring functions 100, 101 are used by a power extraction control unit 19 to control the combiner/extraction unit 14 to draw power from the forward power feed 11 to makes up any shortfall in the power required to operate the components 16, 17. This has the advantage that each customer premises system 2 can deliver power to the DPU 1 at a rate determined only by the services it is itself using, and without any need for co-ordination by the DPU 1.

In one embodiment, each Reverse Power Feed 24 provides power to the DPU 1 to operate that customer's respective modem 17 when that modem is operating at Full Rate, i.e. L0 operational mode. The management unit 28 in the customer premises equipment 2 can determine what mode is in use by monitoring the operation of the corresponding modem 27 in the customer premises.

The Forward Power Feed 11 in the DPU 1 is used to provide power for functions such as common electronics, fiber backhaul, power management circuitry, network management, supervision electronics, and switching. It also provides power to a customer's remote modem 17 when that modem is operating in any Low Power Mode, or when required to keep a vector group operational during reconfiguration after a user has shut down his connection and, with it, the associated Reverse Power Feed.

This combined RPF and FPF powering scheme has a number of advantages.

Firstly, the DPU backhaul, management, supervision and other common electronics are always powered and available, even when no customer premises equipment is connected, thus there is no requirement for a persistent management agent (PMA) to be available to power up the system when a connection is to be made.

Secondly, a vector group can remain intact and fully powered when a customer leaves the group, without the need for others to make up the shortfall until a smaller group can be configured.

Thirdly, reverse power feed is not required when a customer operates in a low power Mode—this means that the reverse power feed can be optimized in design by only having to work efficiently at one power rating rather than several different ones.

Fourthly, a "lifeline" analog voice service becomes available since the remote DPU will be always be powered and available, with the customer equipment operating in low power mode either from batteries or by a traditional low-power forward feed over the network connection 26.

Fifthly, since each customer is only providing the additional power needed to provide the services he is actually using, at the time he is using it, the power sharing system is seen as fair and no customer is being subsidized by another. This will also encourage users not to waste energy, and to operate at low power modes whenever possible.

Sixthly, keeping the common electronics of the DPU continually powered avoids delay as the optical backhaul does not have to re-sync before traffic can be transmitted.

The invention claimed is:

1. A telecommunications local distribution network comprising:
   a distribution point having an electrical backhaul connection;
   a plurality of user terminal equipments each connected to the distribution point by a respective electrical connection,
   at least some of the user terminal equipments having provision for delivering electrical power to the distribution point over the respective electrical connections,
   each user terminal equipment being capable of operating in two or more modes operating different telecommunications services and autonomously controlling electrical power to be delivered in accordance with a current mode of operation, and
   the distribution point having provision for drawing electrical power from the user terminal equipments, and having provision for determining any shortfall between electrical power required for operation of the distribution point and electrical power delivered to the distribution point from the premises user terminal equipments, and having provision for drawing from the electrical backhaul connection sufficient power to meet that shortfall.

2. A telecommunications local distribution network according to claim 1, wherein each user terminal equipment is arranged to provide an electrical feed to the distribution point when using a high speed data service, and to shut off the electrical feed when operating a basic telephony service.

3. A telecommunications local distribution network according to claim 1, wherein each user terminal equipment is arranged to detect failure of an external electricity supply to the user terminal equipment and to shut off the electrical feed to the distribution point when such failure is detected.

4. A telecommunications local distribution network according to claim 1, wherein the distribution point is arranged to detect loss of an electrical power supply feed from a first user terminal equipment, and to draw power from the electrical backhaul connection to operate a shutdown process for functions operated by the distribution point in relation to the first user terminal equipment.

5. A telecommunications local distribution network according to claim 4, wherein the distribution point is arranged to deliver electrical power from the electrical backhaul connection to user terminal equipments not currently able to deliver electrical power to the distribution point.

6. A telecommunications system according to claim 1, wherein the distribution point has a monitoring system for monitoring the electrical power delivered from each user terminal equipment, comparing the electrical power delivered from each user terminal equipment with a nominal value associated with the mode in which the user terminal equipment is operating, and generating an alert if the electrical power delivered falls below the nominal value.

7. A telecommunications system according to claim 1, wherein the user terminal equipment is configured to deliver a power feed at two or more incremental levels.

8. A telecommunications system according to claim 7, wherein one of the levels is zero.

9. A telecommunications system according to claim 7, wherein the user terminal equipment is configured to operate in at least one mode in which the user terminal equipment draws power from the distribution point, and at least one mode in which the user terminal equipment delivers power to the distribution point.

10. A telecommunications system according to claim 1, in which the distribution point is configured to require the user terminal equipment to complete an authentication process in order to authorize provision of services requiring higher power input.

11. A telecommunications system according to claim 1, in which the distribution point is configured to provide high power-drain services to a connection only if a predetermined power input is delivered over the respective connection.

12. A user terminal equipment for connection to a telecommunications network by an electrical connection, having provision for delivering electrical power to a distribution point over the electrical connection, and capable of operating in two or more modes operating different telecommunications services and autonomously controlling the electrical power to be delivered in accordance with a current mode of operation.

13. A user terminal equipment according to claim 12, arranged to provide an electrical feed to the distribution point when using a high speed data service, and to shut off the electrical feed when operating a basic telephony service.

14. A user terminal equipment according to claim 12, arranged to detect failure of an external electricity supply to the user terminal equipment and to shut off the electrical feed to the distribution point when such failure is detected.

15. A user terminal equipment according to claim 12, configured to deliver a power feed at two or more incremental levels.

16. A user terminal equipment according to claim 15, wherein one of the levels is zero.

17. A user terminal equipment according to claim 15, configured to operate in at least one mode in which the user terminal equipment draws power from the distribution point, and at least one mode in which the user terminal equipment delivers power to the distribution point.

18. A method of operating a telecommunications local distribution network comprising:
a distribution point having an electrical backhaul connection;
a plurality of user terminal equipments each connected to the distribution point by a respective electrical connection and capable of operation in a plurality of modes operating different telecommunications services,
in which at least some of the user terminal equipments deliver electrical power to the distribution point over their respective electrical connection by autonomously controlling the electrical power to be delivered in accordance with a current mode of operation, and the distribution point draws from the electrical backhaul connection any power required to meet a requirement in excess of that delivered from the user terminal equipments.

19. A method according to claim 18, wherein each user terminal equipment provides an electrical feed to the distribution point when using a high speed data service, and shuts off the electrical feed when operating a basic telephony service.

20. A method according to claim 18, wherein each user terminal equipment is arranged to detect failure of an external electricity supply to the user terminal equipment and to shut off an electrical feed to the distribution point when such failure is detected.

21. A method according to claim 18, wherein the distribution point draws power from the electrical backhaul connection to operate a shutdown process for functions operated by the distribution point in relation to a user terminal equipment if the distribution point detects loss of an electrical power supply feed from the user terminal equipment.

22. A method according to claim 21, wherein the distribution point delivers electrical power from the electrical backhaul connection to user terminals not currently able to deliver electrical power to the distribution point.

23. A method according to claim 18, wherein the distribution point monitors power delivery from each user terminal equipment, compares the power delivery with a nominal value associated with a mode in which the user terminal equipment is operating, and generates an alert if the power delivered falls below the nominal value.

24. A method according to claim 18, wherein the user terminal equipment is configured to deliver a power feed at two or more incremental levels.

25. A method according to claim 24, wherein one of the levels is zero.

26. A method according to claim 24, wherein the user terminal equipment is operable in at least one mode in which the user terminal equipment draws power from the distribution point, and at least one mode in which the user terminal equipment delivers power to the distribution point.

27. A method according to claim 18, in which the distribution point and the user terminal equipment complete an authentication process in order to authorize provision of services requiring higher power input.

28. A method according to 18, in which the distribution point is configured to provide high power-drain services to a connection only if a predetermined power input is delivered over the respective connection.

* * * * *